United States Patent
Zinck-Petersen et al.

[15] 3,670,175
[45] June 13, 1972

[54] ARRANGEMENT FOR SUPPLYING ENERGY TO DEVICES AS HIGH POTENTIAL, FOR EXAMPLE FOR OPERATING PURPOSES

[72] Inventors: Jorgen Zinck-Petersen; Bertil Lundqvist, both of Hokasen, Sweden

[73] Assignee: Allmanna Svenska Elektriska Aktiebolaget, Vasteras, Sweden

[22] Filed: Dec. 18, 1970

[21] Appl. No.: 99,343

[52] U.S. Cl....................................307/64, 317/60, 307/140
[51] Int. Cl. .......................................................H01h 3/26
[58] Field of Search..................307/140, 64, 66, 92, 93, 94, 307/138, 139; 317/58, 59, 60

[56] References Cited

UNITED STATES PATENTS 3,064,163  11/1962  Smith..................................317/60 R Primary Examiner—Herman J. Hohauser
Attorney—Jennings Bailey, Jr.

[57] ABSTRACT

An arrangement for supplying electric energy to operating, measuring and indicating devices placed at the potential of a high voltage line. When current flows through the line, the energy is transmitted from the line to said devices through a saturated current transformer. When the line has no load, however, the energy is transmitted from an energy source at earth potential through a rotating electric generator at high potential.

8 Claims, 4 Drawing Figures

INVENTOR.
JÖRGEN ZINCK-PETERSEN
BY
BERTIL LUNDQVIST the energy transmission from earth to high potential is effected through a hydraulic medium, and

ARRANGEMENT FOR SUPPLYING ENERGY TO DEVICES AS HIGH POTENTIAL, FOR EXAMPLE FOR OPERATING PURPOSES

BACKGROUND OF THE INVENTION

1. Field of the Invention

The present invention relates to an arrangement in high voltage equipment for supplying energy to means placed at high potential, for example for actuating, measuring and signalling purposes.

2. The Prior Art

For example in circuit breakers, current measuring devices and series capacitor batters in power transmission lines, it is often necessary to supply energy for the purposes mentioned, either continuously or intermittently. It has previously been suggested to make use of the fact that energy is already available at high potential in the live line, by taking out the necessary electric energy, for example to operate a circuit breaker, directly from the high voltage network with the help of voltage dividers to earth or with the help of current transformers, usually combined with an energy accumulator. However, these feeding systems have the disadvantage that they do not operate when the network has no voltage or current flowing it it. Different systems have therefore been used to transmit the necessary operating energy to high potential from a separate energy member located at ground level. For the transmission of energy, therefore, rotating shafts, insulating transformers and pneumatic or hydraulic systems, for example, have been used. However, insulating transformers are relatively expensive, particularly at voltage levels of 1,000 kilovolts and above, and the other alternatives have weaknesses as far as life and power consumption are concerned.

This is particularly so in a system where a motor at ground level drives a generator at high potential by means of a rotating insulating rod. In such a system the rod must be journalled about every meter because of problems with the critical number of revolutions. The bearings cannot be lubricated since a possible leakage of lubricant impairs the insulation. Unlubricated bearings have a relatively short life and this simple arrangement is therefore unsuitable for continuous operation.

SUMMARY OF THE INVENTION

The object of the present invention is to provide an energy supply system which is not hampered by the disadvantages mentioned. This is achieved with a supply system which, in a manner known per se, comprises a saturated current transformer connected to the high voltage line and which is characterized in that the arrangement also comprises a rotating electric generator placed at high potential and arranged to be supplied with driving power from an energy source placed at earth potential, and a control system to start the generator when the line is disconnected or is only slightly loaded. A system of this type has a relatively long life and its power consumption is relatively slight. The increased costs of the proposed combined system are more than compensated by the fact that the costs for supplying power to the part of the system for transmitting energy from earth to high potential are almost eliminated. Furthermore, this part can be made much more simple than if it were to be responsible for the entire energy supply.

It has proved to be particularly advantageous for the energy transmission from earth to high potential to use an electro-hydraulic system consisting of a hydraulic pump at earth potential, driven by an electric motor, and a hydraulic motor at high potential which in turn drives the electric generator situated there. The hydraulic pump and motor can be connected together with the help of electrically insulating conduits which bridge the insulation distance, and as energy-transmitting medium in the system an electric insulating liquid, for example hydraulic oil, is used. A particular advantage with such a system is that the oil can be used at high potential for lubricating and cooling purposes. The electric generator located at high potential may, for example, be arranged in an oil-filled capsule which is connected in series with the hydraulic conduit. Satisfactory lubrication of the bearings of the electric generator is thus achieved, thus considerably increasing their life. Furthermore, with such an arrangement, the hydraulic motor can be located in the immediate vicinity of the generator capsule, thus eliminating the drawback of oil leakage through the shaft sealing of the hydraulic motor.

In a system according to the present invention it is also advantageous for the transmission of energy from earth to high potential to use the above-mentioned arrangement with a rotating insulating rod. Since with such a system a current transformer supplies the necessary energy from the line current as soon as this current exceeds a certain value, the operating time of the rod decreases considerably and the arrangement therefore acquires an entirely satisfactory length of life.

In many operating circuits it is necessary for the energy supplied to be stored in an energy accumulator, for example, a capacitor, arranged in the immediate vicinity of the operating member. In such cases, the control system for starting the electric generator is suitably arranged to sense the voltage over the capacitor and/or the position of a circuit breaker in the high voltage line. If the capacitor voltage is too low or if the breaker is open a signal is transmitted to earth potential, preferably with the help of electric optical members, to start the separate energy member.

BRIEF DESCRIPTION OF THE DRAWINGS

The invention will now be more fully described with reference to two embodiments which are shown schematically in the accompanying drawing, in which FIG. 2 shows another embodiment in which the energy transmission takes place by means of a rotating insulating rod, while

DESCRIPTION OF THE PREFERRED EMBODIMENTS

Figure 1:
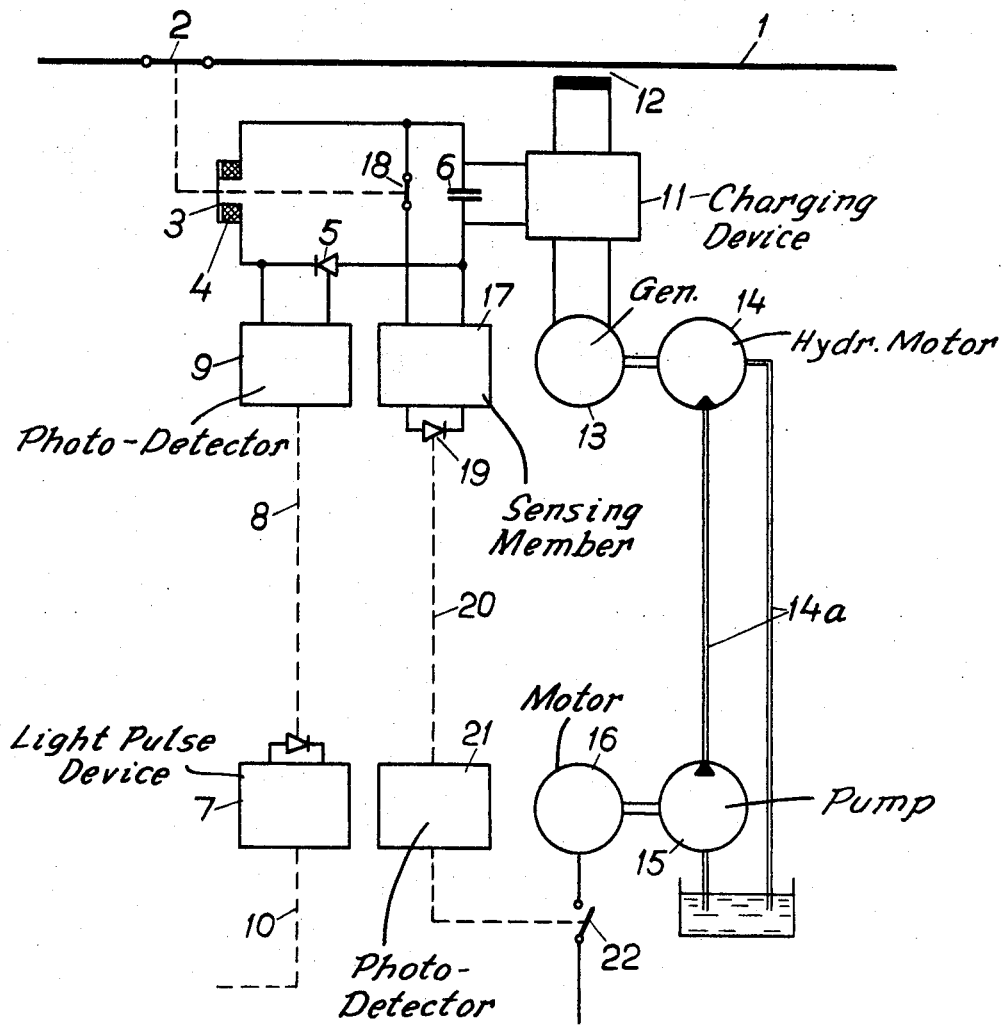
FIG. 1 shows an embodiment in which the energy transmission from earth to high potential is effected through a hydraulic medium.

FIG. 1 shows a high voltage AC transmission line 1, the operating voltage of which is of the order of 1,000 kilovolts. For connection and disconnection of the line 1 an air blast circuit breaker 2 is arranged which is operated with the help of an air blast valve 3. This valve is in turn operated with the help of an electro-dynamic operating device comprising an operating coil 4 which is connected through a thyristor 5 to a capacitor 6, which, under normal operation, is permanently charged. For the firing of the thyristor 5 there is a light pulse device 7 at earth potential which is connected through a light guide 8 to the photodetector 9. When a tripping signal is supplied to the light pulse device 7 through an operating conduit 10, a light pulse is emitted through the light guide 8 to the photodetector 9, which is then arranged to influence the thyristor 5 so that it ignites. The capacitor 6 will then be discharged through the operating coil 4, whereupon the valve 3 is operated and actuates the circuit breaker 2.

The capacitor 6 is charged with the help of a charging device 11 which is fed partly from the high voltage line 1 over a saturated current transformer 12 and partly from an electric generator 13 located at high potential and provided with a permanent magnet rotor. The generator 13 is driven by a hydraulic motor 14 which, through insulated conduits 14, for example hydraulic hoses or glass fiber tubes, is connected to a hydraulic pump 15 at earth potential, driven by an electric motor 16. The conduits 14a are arranged inside a hollow porcelain insulator, not shown. The electro-hydraulic supply system acts as a reserve supply system and is only slightly loaded. This system can be started with the help of a sensing member 17 which senses the voltage across the capacitor 6 and the position of the main contact of the circuit breaker 2. This latter sensing is effected with the help of an indicating contact 18 connected to the valve 3.

When the voltage across the capacitor 6 is higher than a certain value and the contact 18 is closed, a light source 19 generates a light pulse train, which is transmitted through a light guide 20 to a photodetector 21 at earth potential. This photodetector, which is connected in the operating circuit of a normally closed contactor 22 for connection and disconnection of the motor 16, thus assures that the contactor 22 is opened. The contactor is provided with a closing delay, adjusted according to the light pulse frequency. The contactor is open as long as the photodetector is actuated. If the voltage across the capacitor 6 decreases or the contact 18 opens, the light pulse train ceases, whereupon the contactor 22 closes, and the motor 16 is started.

In a breaker comprising a plurality of series-connected breaking gaps per pole a corresponding number of generators 13 must normally be provided. In such a case the various hydraulic motors 14 are suitably connected hydraulically in series and fed by a common pump 15.

Figure 2:
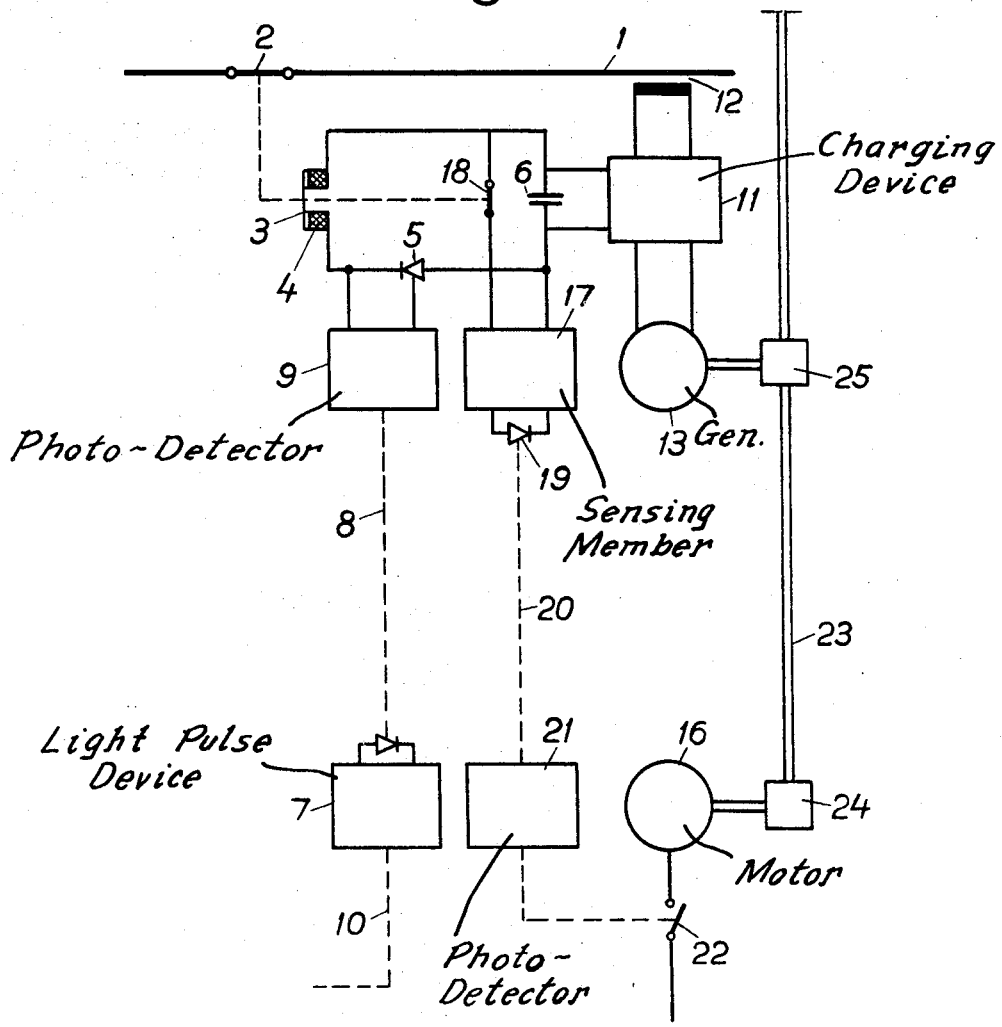

FIG. 2 shows an energy supply system in which the energy transmission from earth to high potential is brought about by means of an electric motor 16 at earth level driving an electric generator 13 at high potential through a rotating insulating rod 23. Otherwise this system does not differ from that shown in FIG. 1. In order to achieve a suitable speed for the rod 23, gears 24 and 25 are provided between the rod and the motor 16 and between the rod and the generator 13. With breakers having a plurality of series-connected breaking gaps per pole, where the breaking gaps are arranged vertically one above the other, the rod 23 can be extended upwardly so that it drives the generators for all the breaking gaps of the circuit breaker pole. The rod is suitably arranged inside a hollow porcelain insulator.

Figure 3:
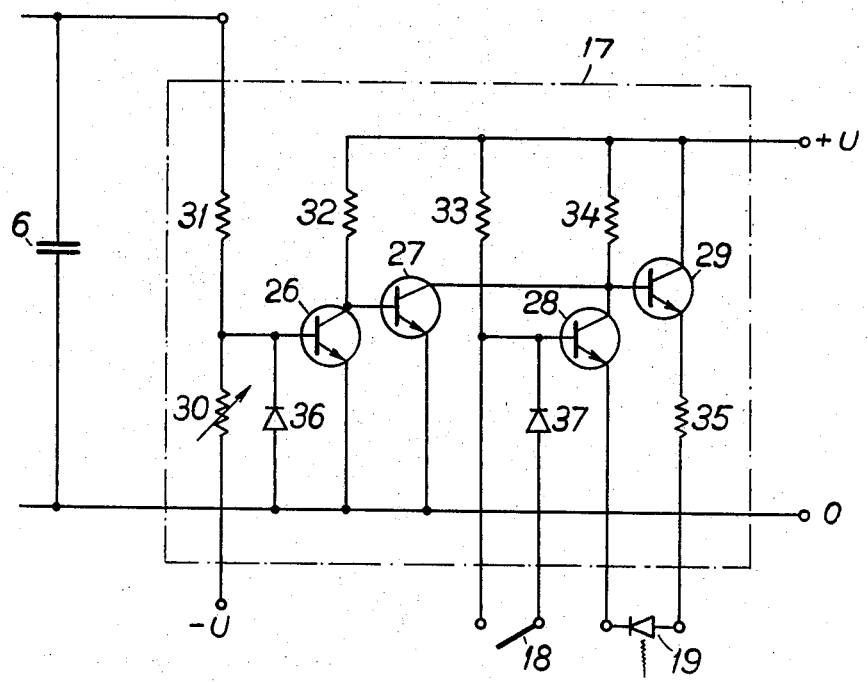
FIGS. 3 and 4 show circuit diagrams of a sensing member and a light source, respectively, which are parts of the energy supply systems shown schematically in FIGS. 1 and 2.

FIG. 3 shows the circuitry of the sensing means 17, which comprises four transistors 26 to 29, six resistors 30 to 35 and two diodes 36 and 37. The power for the sensing means 17 is supplied to terminals +U, O and —U from the charging device 11. When the voltage across the capacitor 6 exceeds a specified level, determined by the negative potential at the terminal —U, and the contact 18 is closed, the output transistor 29 will conduct, and the light source 19 is actuated. The power is then furnished by the power supply. The number of contact positions and voltage levels to be indicated can easily be increased by connected similar circuits in parallel at the base of the output transistor.

Figure 4:
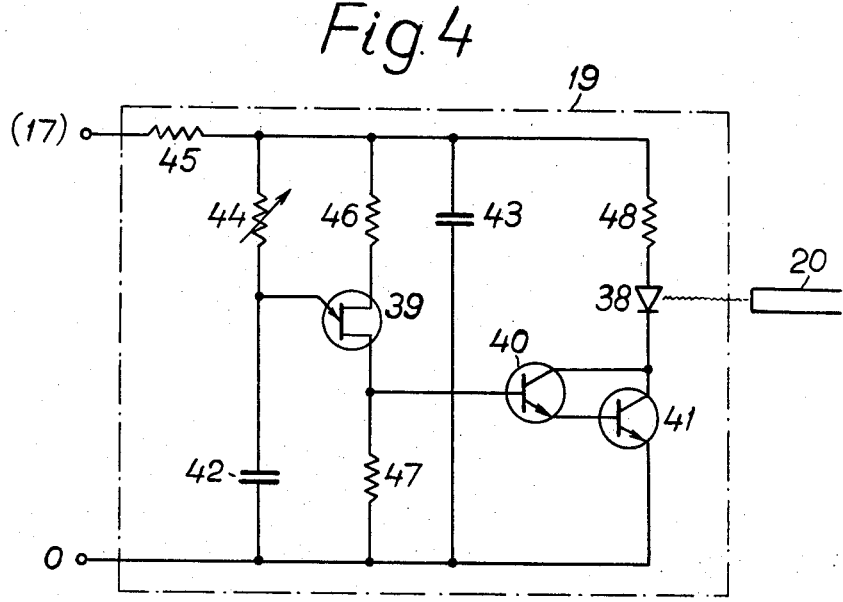

FIG. 4 shows the circuitry of the light source 19, which comprises a light emitting diode 38, an unijunction transistor 39, two transistors 40 and 41, two capacitors 42 and 43, and five resistors 44 to 48. When the light source 19 is actuated by the sensing means 17, the light emitting diode 38 will generate a light pulse train, the frequency of which is determined by the resistor 44 and the capacitor 42. Making use of the fact that the light intensity of a light emitting diode is proportional to the current amplitude and its life endurance is proportional to the average value of the current, a high light intensity and a long life are obtained by switching the diode 38 with short high current pulses at a moderate frequency. A further advantage with a switched light source compared with a continuous one is that it simplifies the design of the photodetector 21 by making it possible to use AC-coupling of the amplifiers. Furthermore, a rather high signal/noise ratio of the photodetector is obtained.

The relay 22 is normally closed. When the photodetector 21 is actuated by the light pulse train from high potential level the relay 22 opens. The relay is provided with a closing delay, adjusted according to the light pulse frequency. The relay is open as long as the photodetector is actuated.

We claim:

1. Arrangement for supplying energy to a device (3) at high potential in connection with a high-voltage line (1), said arrangement comprising means (12) for supplying energy to said device when current flows through said line (1), the arrangement further comprising a rotating electric generator (13) at high potential and means operatively connected thereto to supply said generator with driving power from an energy source (15, 16) at earth potential, and a control system (17, 19, 20, 21) responsive to a load on the line below a predetermined value to start the generator (13).

2. Arrangement according to claim 1, in which said energy supplying means is a current transformer connected to the high-voltage line.

3. Arrangement according to claim 1, in which the power supply means comprises a hydraulic motor (14) at high potential and the energy source comprises an insulating oil conduit (14a) and a hydraulic pump (15) at earth potential, said conduit connected said pump to said motor.

4. Arrangement according to claim 3, in which the generator is enclosed in a casing filled with oil which is connected in series with the oil conduit (14a).

5. Arrangement according to claim 1, in which the power supply means comprises a driving member (16) at earth potential and an insulating shaft connecting the driving member to the generator.

6. Arrangement according to claim 1, in which the device includes means for breaking the circuit in the line, in which an energy accumulator (6) is arranged in connection with said device, and in which said control system (17, 19, 20, 21) comprises means (17) for sensing the voltage across the energy accumulator (6) and the condition of the circuit breaking means, a control member (22) at earth potential for connection and disconnection of the energy source (15, 16), and a signal transmission system connecting the sensing means to the control member for operation thereof.

7. Arrangement according to claim 6, in which said signal transmission system comprises a light source (19) at high potential, and a light-sensitive element (21) at earth potential connected with said control member (22) and responsive to emission from said light source.

8. Arrangement according to claim 7, in which said light source generates a signal in the form of pulses.

* * * * *

UNITED STATES PATENT OFFICE
CERTIFICATE OF CORRECTION

Patent No. 3,670,175                      Dated June 13, 1972

Inventor(s) Jorgen Zinck-Petersen and Bertil Lundqvist

It is certified that error appears in the above-identified patent and that said Letters Patent are hereby corrected as shown below:

After the Heading, insert:

Claims Priority, Application Sweden,
  December 19, 1969, 17564/69

Signed and sealed this 12th day of June 1973.

(SEAL)
Attest:

EDWARD M. FLETCHER, JR.                ROBERT GOTTSCHALK
Attesting Officer                      Commissioner of Patents